United States Patent
Dunn et al.

(10) Patent No.: US 8,564,909 B1
(45) Date of Patent: Oct. 22, 2013

(54) MULTILAYER BOND PADS FOR HARD DISK DRIVE SUSPENSIONS

(71) Applicant: Magnecomp Corporation, Murrieta, CA (US)

(72) Inventors: Christopher Dunn, Austin, TX (US); Peter Hahn, Wildomar, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 13/657,478

(22) Filed: Oct. 22, 2012

Related U.S. Application Data (60) Provisional application No. 61/550,881, filed on Oct. 24, 2011.

(51) Int. Cl.
*G11B 5/48* (2006.01)

(52) U.S. Cl.
USPC ........................................... 360/245.9

(58) Field of Classification Search
USPC .......... 360/245.9, 245.8, 245.7, 245.6, 245.5, 360/245.4, 245.3; 29/603.04, 603.03
See application file for complete search history.

(56) References Cited

U.S. PATENT DOCUMENTS

| | | | |
|---|---|---|---|
| 4,125,310 A | 11/1978 | Reardon, II | |
| 4,961,259 A | 10/1990 | Schreiber | |
| 6,567,238 B1 * | 5/2003 | Renken et al. | 360/99.12 |
| 6,642,443 B2 | 11/2003 | Okada et al. | |
| 6,662,443 B2 | 12/2003 | Chou et al. | |
| 6,772,515 B2 | 8/2004 | Suwa et al. | |
| 7,009,809 B2 * | 3/2006 | Hanssen | 360/99.12 |
| 7,064,928 B2 | 6/2006 | Fu et al. | |
| 7,146,722 B2 * | 12/2006 | Perry | 29/860 |
| 7,272,889 B2 | 9/2007 | Aonuma et al. | |
| 7,342,750 B2 | 3/2008 | Yang et al. | |
| 7,379,267 B2 * | 5/2008 | Engesser et al. | 360/99.12 |
| 7,382,582 B1 | 6/2008 | Cuevas | |
| 7,710,688 B1 | 5/2010 | Hentges et al. | |
| 7,923,644 B2 | 4/2011 | Ishii et al. | |
| 7,924,529 B2 | 4/2011 | Ohsawa et al. | |
| 2005/0174684 A1 * | 8/2005 | Hanssen | 360/99.12 |
| 2006/0250139 A1 * | 11/2006 | Perry | 324/537 |
| 2007/0035876 A1 * | 2/2007 | Engesser et al. | 360/99.12 |
| 2007/0058292 A1 * | 3/2007 | Choi et al. | 360/99.12 |
| 2007/0159717 A1 * | 7/2007 | Miyajima et al. | 360/99.12 |
| 2008/0019039 A1 * | 1/2008 | Ng et al. | 360/99.12 |
| 2012/0050913 A1 * | 3/2012 | Jang et al. | 360/99.12 |

* cited by examiner

*Primary Examiner* — Allen T Cao
(74) *Attorney, Agent, or Firm* — Intellectual Property Law Offices of Joel Voelzke, APC (57) ABSTRACT

A method is presented for creating multilayer bond pads for bonding a disk drive suspension circuit to a read-write head slider. The multilayer bond pads eliminate the need for vias to transition signals between metallization layers within a suspension circuit. The method includes the steps of forming an aperture through an insulating material that has a metalized first side, depositing a second metal layer on the second side and within the aperture, the second metal layer forming an electrical contact with the first metal layer, selectively removing portions of the second metal layer within the aperture and corresponding adjacent portions of the first metal layer thereby dividing the second metal layer and respectively adjacent portions of the first metal layer into a plurality of electrically separated circuit bond pads, each bond pad including respective portions of the first metal layer and respectively adjacent portions of the second metal layer.

17 Claims, 9 Drawing Sheets

*FIG. 14*

MULTILAYER BOND PADS FOR HARD DISK DRIVE SUSPENSIONS

CROSS-REFERENCE TO RELATED APPLICATIONS

This application claims priority from U.S. provisional patent application No. 61/550,881 filed Oct. 24, 2011, the entire contents of which are hereby incorporated by reference as if set forth herein.

BACKGROUND OF THE INVENTION

1. Field of the Invention

This invention relates to the field of hard disk drives. More particularly, this invention relates to the field of a multilayer bond pad for hard disk drive suspensions.

2. Description of Related Art

A hard disc drive (HDD) unit generally uses a spinning storage medium (e.g., a disc or platter) to store data. A read-write head is positioned in close proximity to the spinning storage medium by a Head Stack Assembly (HSA). Mounted on the HSA, a suspension assembly commonly includes a base plate, a load beam, and a flexure trace gimbal to which a slider is mounted. The suspension is mounted to a support arm, also called an actuator arm or a suspension arm. The slider supports the read-write transducer head element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disc surface.

Figure 1:
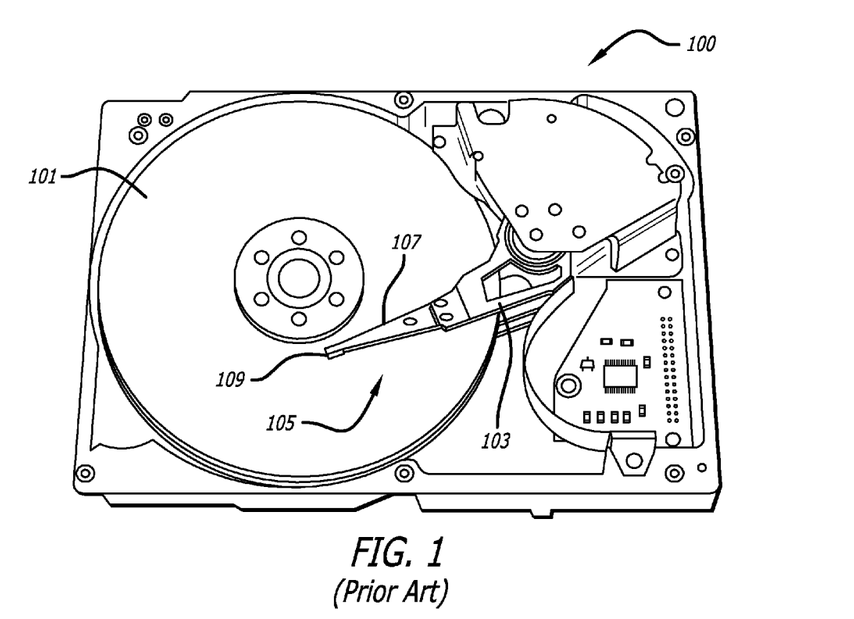
FIG. 1 is a simplified oblique view of a prior art disk drive.

FIG. 1 is a simplified general diagram of a prior art disc drive apparatus 100. Apparatus 100 includes at least one disc 101 (e.g., one, two, three, or more discs), at least one actuator arm or support arm 103 (e.g., one, two, three, or more actuator arms), and at least one suspension assembly 105 (e.g., one, two, three, or more suspension assemblies). Each suspension assembly is composed of a load beam 107 and a flexure trace gimbal assembly 109. The suspension assembly, with trace gimbal assembly and read/write transducer head, may be referred to as a Head Gimbal Assembly (HGA).

Suspensions for hard disk drives and other devices such as optical disk drives include a multi-layer circuit that carries signals between the read/write head, and possibly other parts of the suspension such as one or more microactuators located on the suspension, to the rest of the circuitry within the disk drive. Currently, it is common for suspension circuits to employ vias to form electrical connections between different layers. Vias may be used to connect trace layers such as in interleaved traces for low impedance/high bandwidth interconnects, to connect signal traces to bond pads, to connect a signal trace to a grounded portion of the stainless steel suspension, and to connect other circuit components. Typically, a via is formed in a dielectric layer by making a hole in the layer using laser drilling or chemical etching, and then filling the via hole using either conductive epoxy or electroplating. For example, U.S. Pat. No. 7,272,889 issued to Aounuma et al. purports to disclose one technique for creating such vias. Vias typically range from 20-80 µm in size. When vias are used with a capture pad, the capture pads are typically from 60-120 µm in size.

Figure 2:
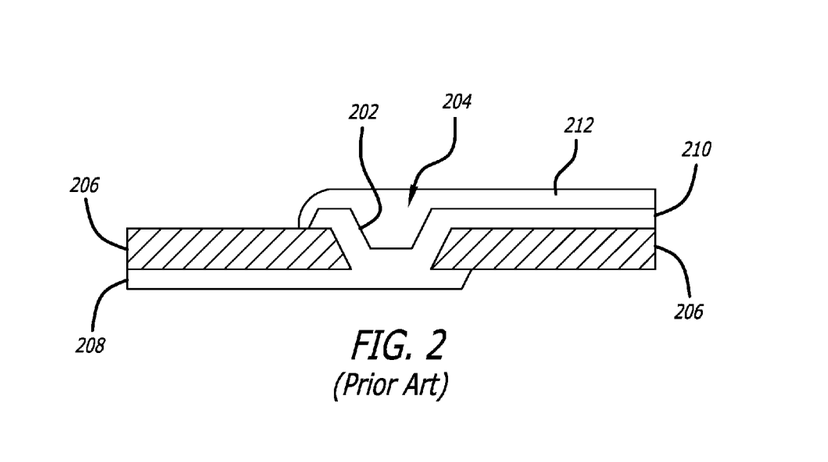
FIG. 2 is a simplified sectional representation of a prior art via.

FIG. 2 is a simplified sectional representation of a prior art via 202. A hole 204 is drilled such as by laser drilling into a layer of dielectric material 206 (e.g., polyimide), the hole 204 extending down to the metalized surface that defines a first metal layer 208 below the dielectric material 206. The via 202 could be either a through-via, which is created by mechanical or laser drilling, all the way down through a first metal layer, or it could be a blind via, which is a via that extends only down to rather than through the first metal layer. Blind vias can be created either by precise numerically controlled (NC) drills with precise depth control or preferably by lasers having specific wavelengths to selectively ablate a first metal layer and then the internal dielectric, stopping at a second metal layer.

In some via manufacturing processes, the second metal layer 210 shown in FIG. 2 is added over and into the hole 204 by electrodeposition. In this way, the second metal layer 210 extends down into the hole 204 thereby defining the via 202. A protective and electrically nonconductive cover coat 212 is then applied to the laminate assembly. This via forming process requires that a photoresist mask that is used to create the second metal layer 210 and its circuit trace pattern be closely aligned with the circuit pattern on the first metal layer 208.

Other types of manufacturing processes (other than electrodepositing) may be used to create vias. For example, a hole could instead be filled with some other conductive material such as a conductive epoxy to form a conductive via.

Figure 3:
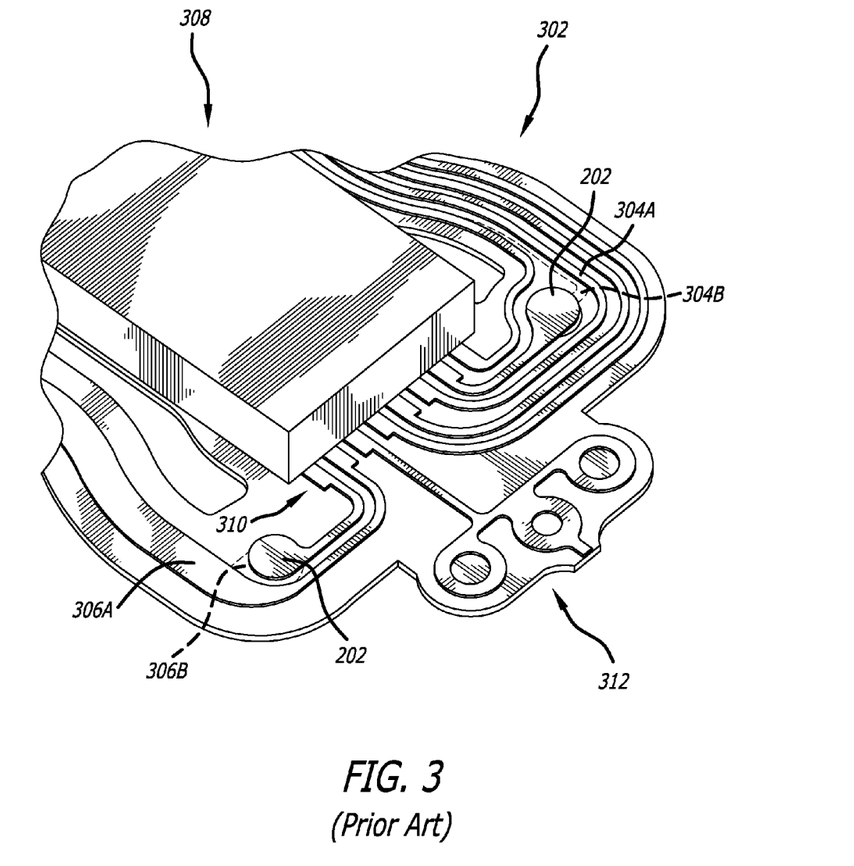
FIG. 3 is an oblique view of a prior art suspension circuit in the area around the head slider, including the via of FIG. 2.
Figure 4A:
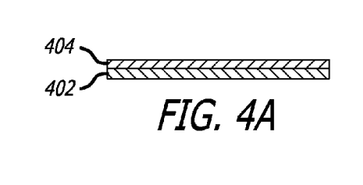
Figure 4B:
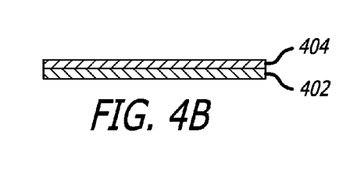

FIG. 3 is an oblique view of an example of a prior art suspension circuit 302 in the area around a read-write head slider 308, illustrating the use of the via 202 to create an interconnection from one metal layer to another layer in the area of the suspension's slider bond pads 310. Read+ and Read− differential signal pair traces 304A and 304B, and Write+ and the Write− differential signal pair traces 306A and 306B, are respectively routed on top of one another most of their distances on the suspension circuit 302 to reduce the impedance of each signal transmission line and to reduce the susceptibility of each signal pair to cross talk. One polarity of a given pair is routed up at a corresponding one of the vias 202 to the top layer where the other polarity is located near the head slider 308 to connect thereto. All of the slider bond pads 310 are therefore located at the same level for electrical connection to the slider 308, such as by solder ball bonding.

The vias 202 shown have via pads of sufficient size so that they can be manufactured in volume without defects due to layer misregistration. The illustration shows a design that is currently available from circuit suppliers.

The structure 312 on the very distal end of the circuit 302 containing the three copper rings provides a ground path to a stainless steel suspension structure below to protect the slider 308, which is sensitive to electrostatic discharge (ESD) damage. The rings are used as reference points by machine vision assembly equipment (not shown) both at the suspension manufacturing level as well as at the head stack assembly (HSA) level.

SUMMARY OF THE INVENTION

When vias are used to make interconnections to slider bonding pads (e.g., as shown in FIG. 3), the large size of the via structure undesirably increases the dimensions and mass of the flexure in the area around the slider. That additional size and mass negatively affects the mechanical performance of the slider and gimbal, and impacts panel density. It is anticipated that in the future, head slider sizes will decrease and the number of electrical connections to the head slider, and hence the number of bond pads necessary, will increase, thus reducing the real estate area in front of the head that is available for slider bond pads.

The present invention relates in some aspects to a multilayer bond pad for hard disk drives and other applications. The multilayer bond pad, and the method of making the multilayer bond pad, as taught herein replaces the traditional via in a suspension circuit. Advantageously, the disclosed multilayer bond pad consumes less area than does a traditional via thereby reducing the size of the flexure circuit for the read-write head. The use of a smaller flexure circuit in the area of the slider bond pad reduces the negative impact that the circuit has on the mechanical characteristics of the disk drive gimbal and on the flying characteristics of the slider. Consequently, a multilayer bond pad as taught herein will allow for denser packing of bond pads at the read-write head as geometries continue to shrink in the future, and will otherwise increase the available circuit real estate available within the gimbal area.

To form the multilayer bond pads of the present invention, a metalized dielectric material is etched to remove the dielectric in an area that will eventually define the bond pads, thus exposing the metal surface that will define the bond pads. Metallization is then applied to the dielectric side that was not previously metalized. This will create a metal/dielectric/metal laminate substrate. The locations where the dielectric was removed will have the two metal layers directly attached to each other, creating an electrical connection between the two metal layers at each bond pad location. The two metal layers are then etched (e.g., at the same time) to create traces and bond pads on each side of the substrate. The substrate can then be processed using standard processes to add the remaining polyimide, covercoat, and finish plating features on the circuit.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIGS. 4A-8C illustrates an embodiment of a process of the present invention for creating the multilayer bond pads of the present invention.

DETAILED DESCRIPTION OF THE PREFERRED EMBODIMENTS

FIGS. 4A-8C illustrate an embodiment of a process of the present invention used to create the multi-layer bond pads of the present invention. The process begins with an insulating layer 402 of dielectric or other insulating material such as polyimide (PI) that has a metalized layer 404 on a first side thereof as illustrated in the two views of FIGS. 4A and 4B. The metal is preferably copper or a high strength copper alloy (generally, Cu).

Figure 5A:
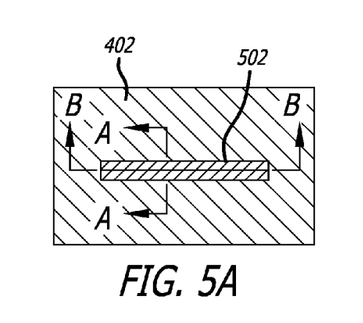
Figure 5B:
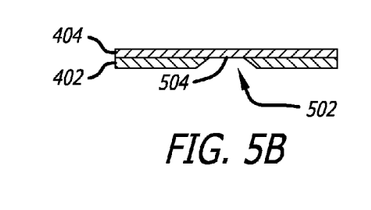
Figure 5C:
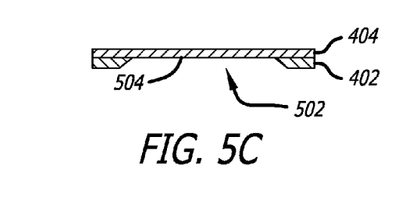

As illustrated in FIGS. 5A-5C, the insulating layer 402 is etched, laser ablated, or otherwise selectively removed to form an aperture 502 in the insulating layer 402 in an area which will eventually define multiple bond pads, thus exposing the metal surface 504 that will define those bond pads. FIG. 5B is taken from the view A-A of FIG. 5A, while FIG. 5C is taken from the view B-B of FIG. 5A.

Figure 6A:
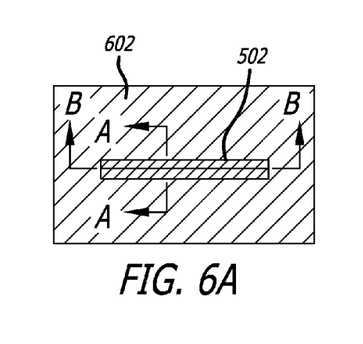
Figure 6B:
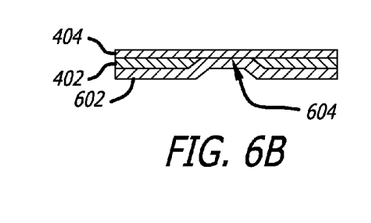
Figure 6C:
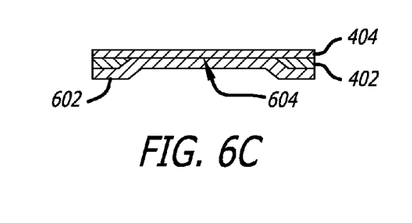

As illustrated in FIGS. 6A-6C, metallization such as by electrodeposition of Cu is then applied to the second and opposite side of the insulating layer 402 that was not previously metalized. This creates a metal/insulator/metal (e.g., Cu/Pi/Cu) laminate substrate as indicated by the addition of the second metal layer 602. The locations 604 where the insulating layer 402 was removed has the two metal layers 404 and 602 directly attached to each other, creating a mechanical bond as well as a direct electrical connection between the two metal layers 404 and 602 in the area that will become a plurality of bond pads of the circuit. FIG. 6B is taken from the view A-A of FIG. 6A, while FIG. 6C is taken from the view B-B of FIG. 6A.

Figure 7A:
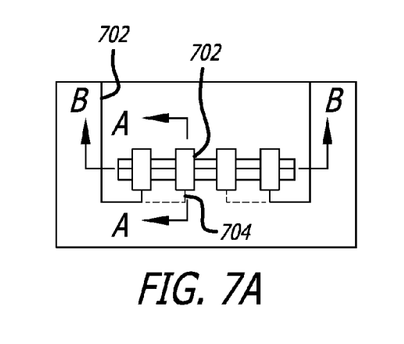
Figure 7B:
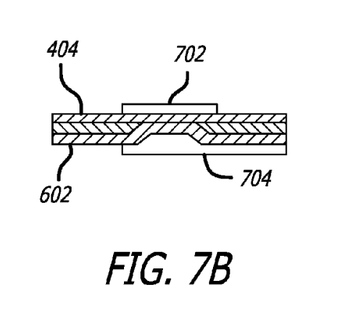
Figure 7C:
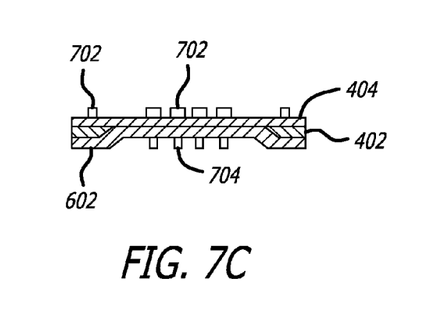

As illustrated in FIGS. 7A-7C, photoresist 702 and 704 is applied, masked, exposed, and then etched to create a photoresist mask on the top and bottom layers. In general, this step uses techniques well known in the art. Note, however, that the photoresist 704 is applied on two layers as shown in FIG. 7B. FIG. 7B is taken from the view A-A of FIG. 7A, while FIG. 7C is taken from the view B-B of FIG. 7A.

Figure 8A:
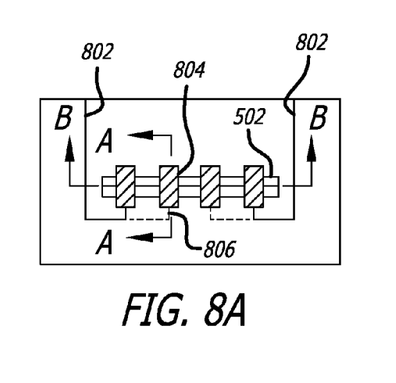
Figure 8B:
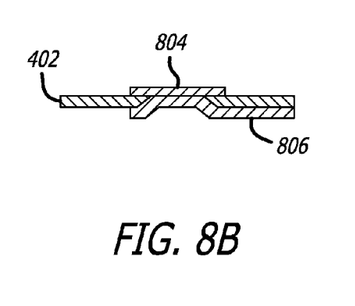
Figure 8C:
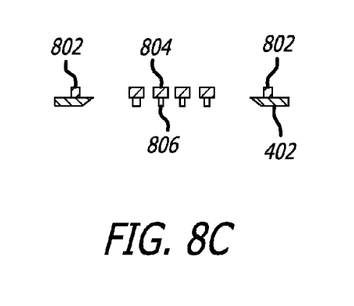

As illustrated in FIGS. 8A-8C, the two metal layers are etched, either at the same time or possibly individually, to singulate and thereby define individual traces 802 and 806 and bond pads 804 out of the metal layers. FIG. 8B is taken from the view A-A of FIG. 8A, while FIG. 8C is taken from the view B-B of FIG. 8A. In FIG. 8A is may be seen that the aperture 502 spans all of the bond pads 804, thereby enabling the connection between the two metal layers at each bond pad 804. Each of the bond pads 804 is located at a terminal end of its associated circuit trace 806. Each signal within the circuit thus includes a first signal trace and a second signal trace, one of the signal traces being located above the other and extending in parallel therewith for most of the length of the signal path, with the two signal traces being electrically and mechanically bonded together at the common bond pad for that signal trace. When multiple signal traces are considered together, the circuit includes individual pairs of signal traces extending in parallel and vertically offset from each other along the circuit, with the individual traces that make up each pair meeting together at respective ones of the slider bond pads.

The substrate and its circuit thus defined thereon can then be processed using standard processes to provide a finished product. For example, additional polyimide, covercoat, and finish plating features may be applied to the circuit. In some embodiments, the aperture 502 may be filled in (e.g., with insulating material) during such a process.

FIGS. 8A-8C illustrate an example that provides four bond pads. It should be appreciated that the teachings herein may be used to provide any number of bond pads (e.g., 2, 3, 4, 5, or more), all formed out of the same multilayer metal defined by the portion of the second metal layer within the aperture and the immediately adjacent portions of the first metal layer.

Thus, the invention may be used with a circuit that has at least four circuit bond pads and at least four head slider bond pads.

The foregoing process description is simplified for the sake of describing the present invention. The actual process will include additional process steps and layers not explicitly described herein including seed layers to define patterns on the insulating layer 402 that will be metalized, tie layers on the seed layers to enhance the adherence of the metal layer to the insulating layer 402, and layers of nickel (Ni) and/or gold (Au) for corrosion resistance and protection. These additional process steps are well known within the art of circuit manufacturing, and specifically suspension circuit manufacturing, and are not be discussed further.

Figure 9:
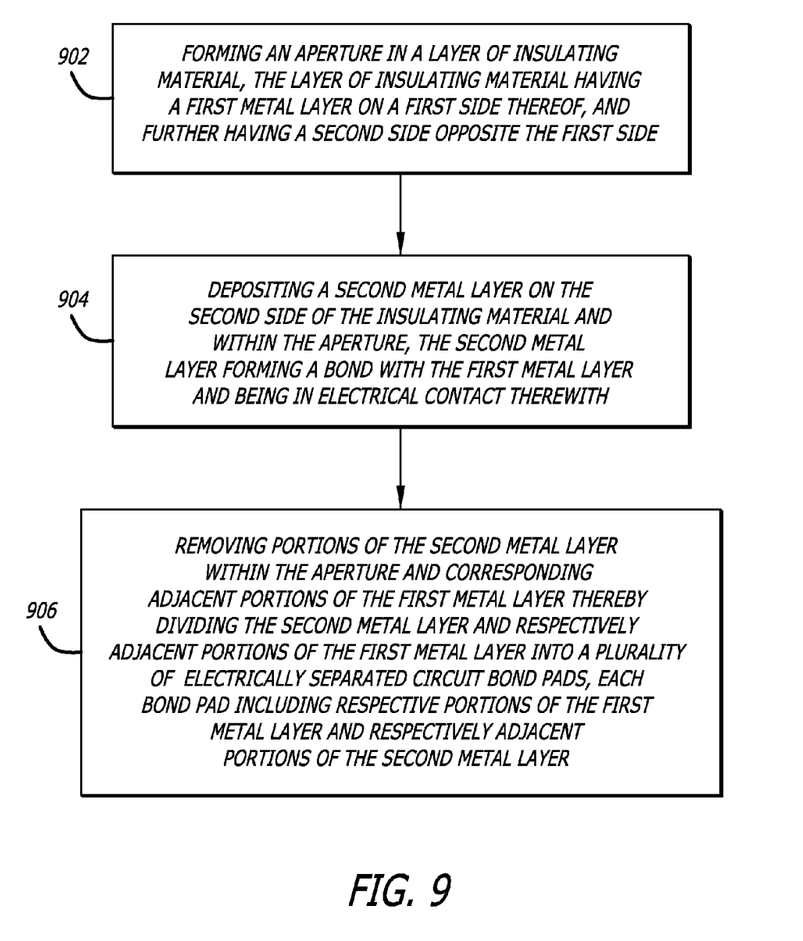
FIG. 9 is a flowchart illustrating an embodiment of a manufacturing process based on the present invention.

In view of the above, a method of forming a plurality of multilayer bond pads for a suspension circuit may involve the operations set forth in FIG. 9.

As represented by block 902, an aperture is formed in a layer of insulating material. The layer of insulating material has a first metal layer on a first side thereof, and further has a second side opposite the first side. As discussed above, this aperture may be formed by laser ablation or some other suitable technique.

As represented by block 904, a second metal layer is deposited on the second side of the insulating material and within the aperture. The second metal layer thereby forms a bond with the first metal layer and makes electrical contact with the first metal layer. This depositing operation may involve electrodepositing or some other suitable technique.

As represented by block 906, portions of the second metal layer within the aperture and corresponding adjacent portions of the first metal layer are removed, thereby dividing the second metal layer and respectively adjacent portions of the first metal layer into a plurality of electrically separated circuit bond pads. Each bond pad thus includes respective portions of the first metal layer and respectively adjacent portions of the second metal layer. As discussed herein, this removal step may comprise applying photoresist to the first and second metal layers, patterning the photoresist, exposing the photoresist, removing areas of the photoresist defined by the exposing, and etching areas of the first and second metal layers no longer covered by photoresist.

Figure 10:
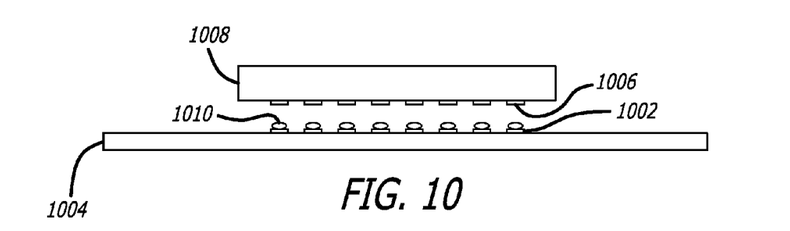
FIG. 10 is a simplified side view illustrating a head slider being bonded to a suspension circuit.

Once the circuit is formed, it can be affixed to a stainless steel suspension in accordance with conventional techniques. In addition, as shown in FIG. 10, the bond pads 1002 of a multilayer circuit 1004 are electrically connected to the bond pads 1006 of a read-write head slider 1008 such as by solder ball bonding using solder balls 1010 or other known methods of electrically connecting the slider bond pads 1006 to the circuit bond pads 1002.

FIGS. 11A-11E and 12A-12E illustrate registration tolerances for the multilayer bond pad of the invention with reference to an example of a stack traced design for a suspension circuit.

Figure 11A:
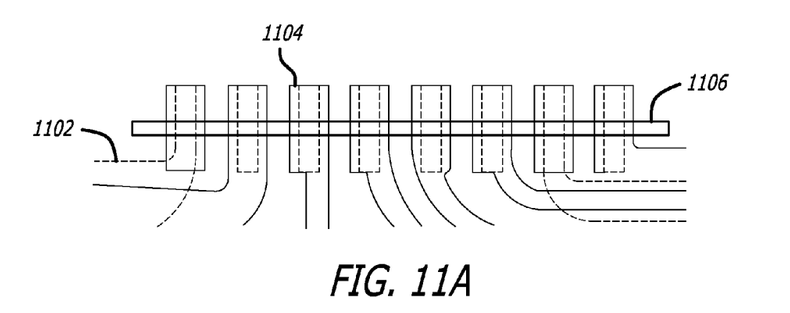
FIGS. 11A-11E are a series of drawings that illustrate an example of registration tolerance of an embodiment of an aperture of the present invention, and associated connections of top and bottom pads.
Figure 11B:
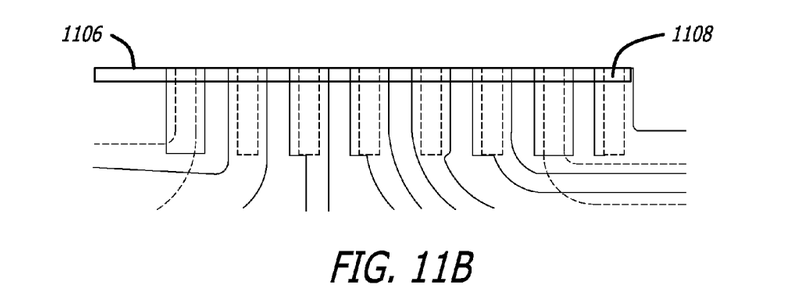
Figure 11C:
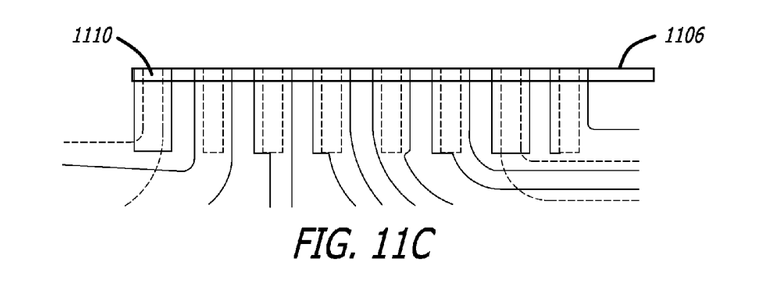
Figure 11D:
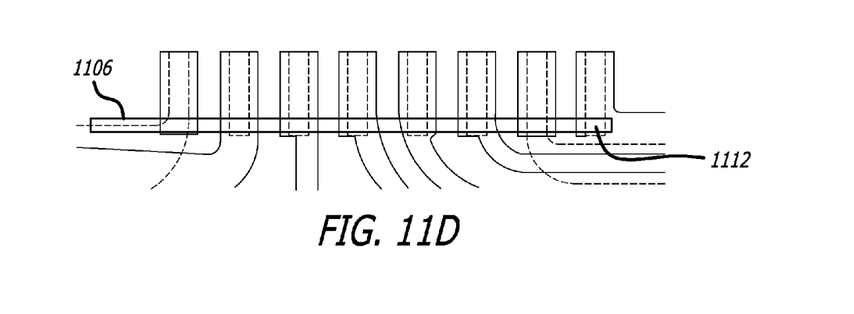
Figure 11E:
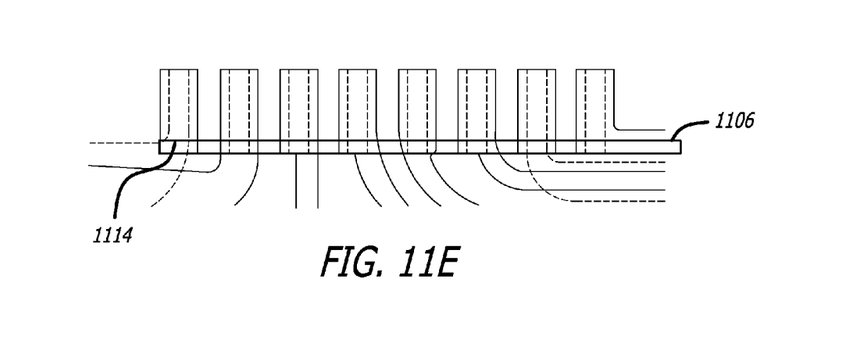

FIGS. 11A-11E illustrate the effects of registration tolerance in the X and Y axes for the insulating layer aperture relative to the metal pads. The illustrated design includes pads and traces on a top layer (e.g., trace 1102), and pads and traces on a bottom layer (e.g., trace 1104). In FIG. 11A, the aperture of the insulating layer (hereafter referred to as the polyimide window 1106) is roughly centered over the top and bottom pads. FIG. 11B illustrates the polyimide window 1106 moved 50 μm up and 50 μm to the left from the position of FIG. 11A. As indicated for example by the line 1108, connectivity between the top and bottom pads is achieved in this case since the polyimide window 1106 is still over each of the top and bottom pads. FIG. 11C illustrates the polyimide window 1106 moved 50 μm up and 50 μm to the right from the position of FIG. 11A. As indicated for example by the line 1110, connectivity between the top and bottom pads is achieved in this case. FIG. 11D illustrates the polyimide window 1106 moved 50 μm down and 50 μm to the left from the position of FIG. 11A. As indicated for example by the line 1112, connectivity between the top and bottom pads is achieved in this case. FIG. 11E illustrates the polyimide window 1106 moved 50 μm down and 50 μm to the right from the position of FIG. 11A. As indicated for example by the line 1114, connectivity between the top and bottom pads is achieved in this case.

Thus, even with a ±50 μm tolerance (alignment error) in the X and Y registration direction, a 20 μm polyimide window will allow the top and bottom pads to be electrically connected. The polyimide window may thus be less than 30 μm wide, the width of the window being measured at its narrowest dimension.

Figure 12A:
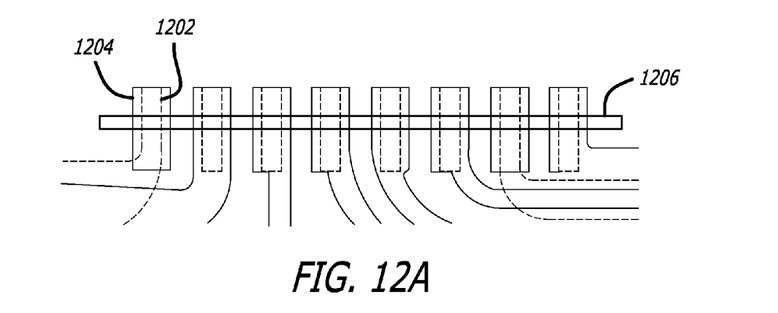
FIGS. 12A-12E are a series of drawings that illustrate an example of registration tolerance between trace layers, and associated connections of bond pads between the layers.
Figure 12B:
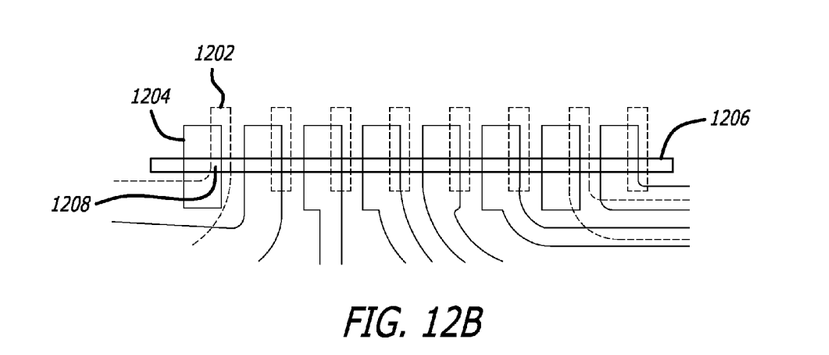
Figure 12C:
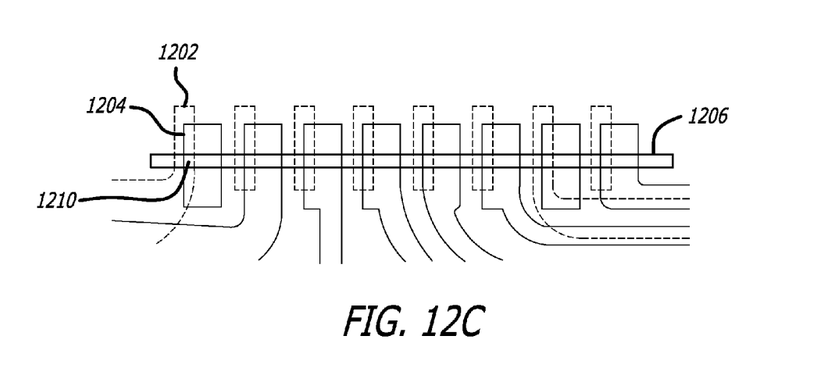
Figure 12D:
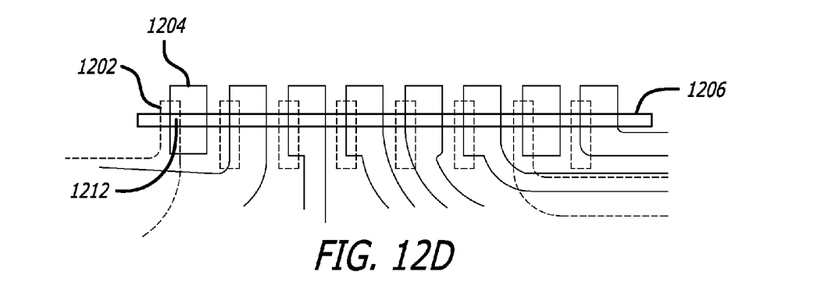
Figure 12E:
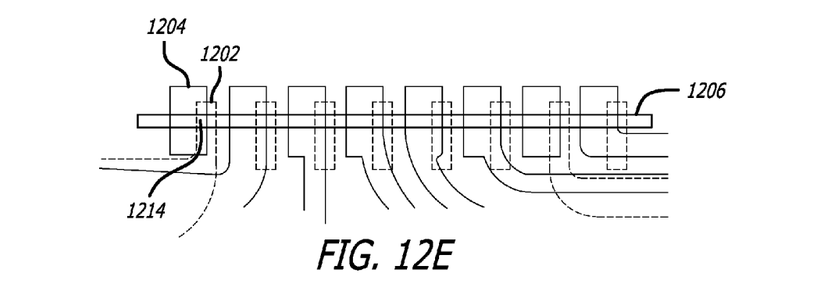

FIGS. 12A-12E illustrate the effects of registration tolerance in the X and Y axes for the top pads relative to the bottom pads. Again, the illustrated design includes pads and traces on a top layer (e.g., pad 1202) and pads and traces on a bottom layer (e.g., pad 1204). In FIG. 12A, the polyimide window 1206 is roughly centered over the top and bottom pads. FIG. 12B illustrates the upper pad 1202 moved 25 μm up and 25 μm to the right from its position in FIG. 12A. As indicated for example by the line 1208, connectivity between the top and bottom pads is achieved in this case since the polyimide window 1206 is still over each of the top and bottom pads. FIG. 12C illustrates the upper pad 1202 moved 25 μm up and 25 μm to the left from the position of FIG. 12A. As indicated for example by the line 1210, connectivity between the top and bottom pads is achieved in this case. FIG. 12D illustrates the upper pad 1202 moved 25 μm down and 25 μm to the left from the position of FIG. 12A. As indicated for example by the line 1212, connectivity between the top and bottom pads is achieved in this case. FIG. 12E illustrates the upper pad 1202 moved 25 μm down and 25 μm to the right from the position of FIG. 12A. As indicated for example by the line 1214, connectivity between the top and bottom pads is achieved in this case. Thus, even with a ±25 μm registration tolerance (alignment error) between trace layers, the pads are still electrically connected.

By creating a dielectric window that extends across (e.g., spans) what will eventually define multiple bond pads, and preferably across all bond pads, the present invention minimizes the impact of layer misregistration. Minimizing the impact of layer misregistration is important to achieving the goal of tight bond pad pitches needed for current and future suspension head designs. When combined with reduced trace width of the bottom metal layer of the bond pad to the top metal layer, circuits can be designed that allow higher registration tolerance between the dielectric window and the traces, while utilizing the tight layer registration between the top and bottom metal layer masks.

Figures 13, 14:
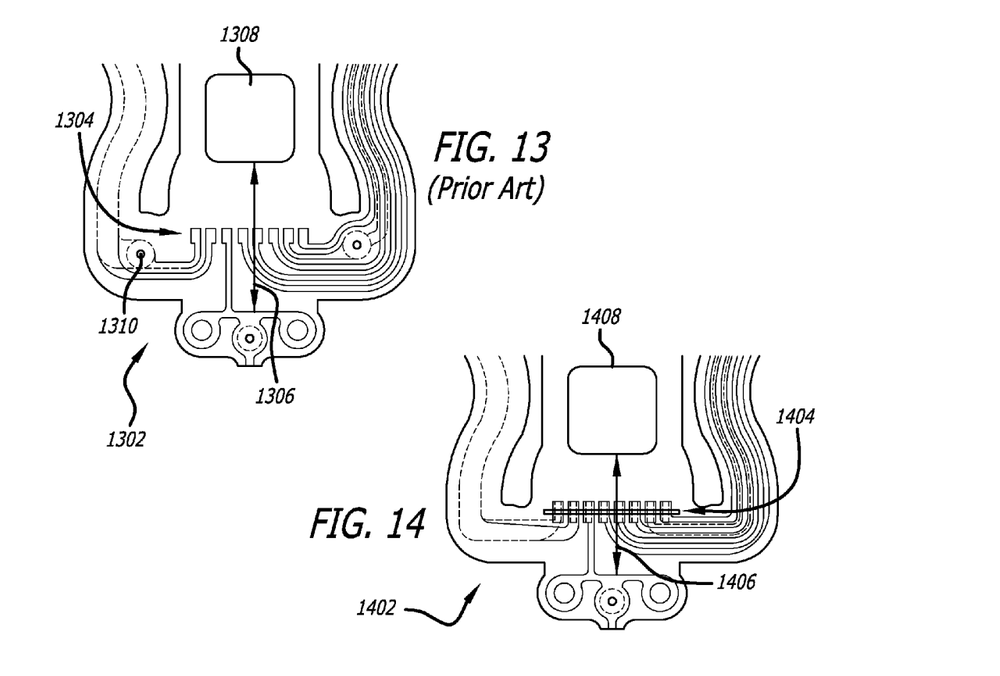
FIG. 13 is a top plan view of a prior art suspension circuit in the area of the slider bond pads.
FIG. 14 is a top plan view of an embodiment of a suspension circuit according to the present invention in the area of the slider bond pads.

FIGS. 13 and 14 illustrate an example of space savings that may be achieved through the use of the present invention. FIG. 13 is a top plan view of a prior art suspension circuit 1302 in the area of the slider bond pads 1304. As indicated by the arrow 1306, the length of the circuit in front of the slider 1308 when measured as shown is 85 μm. FIG. 14 is a top plan view of a corresponding suspension circuit 1402 according to the present invention in the area of the slider bond pads 1404. As indicated by the arrow 1406, the length of the circuit in front of the slider 1408 when measured as shown is 68 μm. FIG. 14 compared to FIG. 13 thus shows that using the multilayer bond pads of the present invention allows the length of the circuit to be reduced by 17 μm.

The prior art circuit of FIG. 13 uses a via 1310 to transition one polarity of a differential signal pair, e.g., the Write+ signal of a Write+/Write− differential signal pair, to the same horizontal level as the other polarity, specifically the top level of the circuit, for connecting to its associated circuit bond pad at the same top level of the circuit. In this way, both circuit bond pads are located at the top level of the circuit for bonding to the head slider bond pads such as by solder ball bonding or other known head slider bonding techniques. This transition occurs proximate the distal end of the circuit near the circuit bond pads. Although there may be other transitions and/or vias elsewhere in the circuit, the multilayer bond pad occurs within a distal half of the length of the circuit trace, which is made up of two individual circuit traces at different vertical levels.

In contrast, the circuit of FIG. 14 does not require vias to transition a signal from one level to the next. Accordingly, after the Write+ and Write− signal halves have traveled one over the other for a majority of the their respective lengths within the suspension circuit, no via is needed and the only horizontal level transition that needs to occur within the signal trace occurs at the circuit bond pad itself. The same is true of the Read+ and Read− signal pair, and any other signal trace that needs to change horizontal levels within the region of the slider in order to be available for electrical connection to the slider. The present invention is expected to reduce the size of the transition from one copper layer to another by 25 to 50% as compared to traditional vias.

A further aspect of the invention is that it allows the pads that define the layer transitions to have virtually any shape desired, including oval, rectangular, and teardrop shaped geometries within the solder ball bonding (SBB) region. Such selectively shaped pads can provide distribution of stresses and hence increased strength of the circuit in the layer transition areas as compared to traditional vias, and allow for tailoring of thermal dissipation during the solder ball bonding that defines the slider attachment process.

Still further, by eliminating the larger via and replacing it with a smaller multi-layer bond pad, the present invention would be expected to reduce impedance discontinuities in the signal transmission line. Additionally, by allowing a differential pair of signals to travel on top of each other all the way up to and including the slider bond pads, the present invention would be expected to allow a differential signal pair transmission line to have a more constant impedance all the way up to the bond pad.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass a part or an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations that can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A method of forming a plurality of multilayer bond pads for a suspension circuit of a disk drive comprising:

forming an aperture in a layer of insulating material, the layer of insulating material having a first metal layer on a first side thereof, and further having a second side opposite the first side;

depositing a second metal layer on the second side of the insulating material and within the aperture, the second metal layer forming a bond with the first metal layer and being in electrical contact therewith; and removing portions of the second metal layer within the aperture and corresponding adjacent portions of the first metal layer thereby dividing the second metal layer and respectively adjacent portions of the first metal layer into a plurality of electrically separated bond pads for the circuit, each bond pad including respective portions of the first metal layer and respectively adjacent portions of the second metal layer.

2. The method of claim 1 further comprising bonding a head slider to the circuit, the head slider having a plurality of bonding pads, each head slider bonding pad being bonded to a corresponding bond pad of the circuit.

3. The method of claim 1 wherein the dividing step defines dividing the second metal layer into at least four circuit bond pads.

4. The method of claim 1 wherein the forming an aperture comprises laser ablation.

5. The method of claim 1 wherein the depositing comprises electrodepositing a copper alloy.

6. The method of claim 1 wherein the removing step comprises applying photoresist to the first and second metal layers, patterning the photoresist, exposing the photoresist, removing areas of the photoresist defined by the exposing, and etching areas of the first and second metal layers no longer covered by photoresist.

7. The method of claim 1 wherein the circuit includes at least one pair of signal traces comprising first and second signal traces, the first and second signal traces traveling in parallel one on top of the other at respective vertical levels within the circuit for a majority of their lengths within the circuit, and within a distal of half of the length of said first circuit trace, the first signal trace emerging to the same horizontal level as the second signal trace only at one of said plurality of multilayer bond pads.

8. The method of claim 1 wherein the aperture in the insulating material is less than 30 μm wide in its narrowest dimension.

9. A suspension circuit having a plurality of multilayer bond pads formed according to the method of claim 1.

10. A multilayer bond pad circuit for a disk drive, the circuit comprising:
- a head slider for writing data to a data disk and for reading data from the data disk, the head slider having a plurality of slider bonding pads associated therewith;
- a first metal layer including a first plurality of signal traces, each of the first plurality of signal traces having a respective bond pad at a terminal end thereof;
- a layer of insulating material bonded to the first plurality of signal traces;
- a second metal layer including a second plurality of signal traces bonded to the insulating material;
- wherein:
  - ones of the first plurality of signal traces are disposed above and extend in parallel with respective ones of the second plurality of signal traces;
  - the second plurality of signal traces of the second metal layer extend through at least one aperture in the insulating material to meet the first plurality of signal traces of the first metal layer, respectively, at the respective bond pads;
  - the slider bond pads are electrically and mechanically connected to the first and second signal traces at the respective bond pads;
  - whereby individual pairs of the signal traces extend in parallel and vertically offset from each other along the circuit, and then meet together at respective ones of the slider bond pads.

11. A multilayer bond pad circuit for a disk drive, the circuit comprising:
- a first metal layer defining a plurality of bond pads;
- a layer of insulating material having a first side bonded to the first metal layer, the layer of insulating material having an aperture therethrough that spans the bond pads; and
- a second metal layer bonded to a second side of the insulating material, where a portion of the second metal layer extends into the aperture and is bonded to the bond pads.

12. The circuit of claim 11 wherein the bond pads comprise at least four bond pads.

13. The circuit of claim 11 wherein the first and second metal layers comprise copper alloy electrodeposited on the layer of insulating material.

14. The circuit of claim 11 wherein the circuit includes at least one pair of signal traces comprising first and second signal traces, the first and second signal traces traveling in parallel one on top of the other at respective vertical levels within the circuit for a majority of their lengths within the circuit, and within a distal of half of the length of said first circuit trace, the first signal trace emerging to the same horizontal level as the second signal trace only at one of the bond pads.

15. The circuit of claim 11 wherein a narrowest dimension of the aperture is less than 30 μm wide.

16. The circuit of claim 11 wherein the aperture is filled with additional insulating material.

17. The circuit of claim 11 further comprising a head slider having a plurality of bonding pads, each head slider bonding pad being bonded to a mutually exclusive one of the bond pads.

* * * * *

UNITED STATES PATENT AND TRADEMARK OFFICE
CERTIFICATE OF CORRECTION

| | | |
|---|---|---|
| PATENT NO. | : 8,564,909 B1 | Page 1 of 1 |
| APPLICATION NO. | : 13/657478 | |
| DATED | : October 22, 2013 | |
| INVENTOR(S) | : Christopher Dunn et al. | |

It is certified that error appears in the above-identified patent and that said Letters Patent is hereby corrected as shown below:

In the Claims

In claim 7, column 8, line 59, after "distal," delete "of".

In claim 7, column 8, line 60, delete "circuit" and insert -- signal --.

In claim 10, column 9, line 18, delete "extend" and insert -- extends --.

In claim 14, column 10, line 18, after "distal," delete "of".

In claim 14, column 10, line 19, delete "circuit" and insert -- signal --.

Signed and Sealed this
Third Day of December, 2013

Margaret A. Focarino
*Commissioner for Patents of the United States Patent and Trademark Office*